(12) United States Patent
Campomanes et al.

(10) Patent No.: US 7,303,461 B1
(45) Date of Patent: Dec. 4, 2007

(54) METHOD OF MACHINING AIRFOILS BY DISC TOOLS

(75) Inventors: Marc Lorenzo Campomanes, Longueuil (CA); Charles Edward Becze, Oakville (CA); Bastien Ste-Marie, Varennes (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

(21) Appl. No.: 11/566,825

(22) Filed: Dec. 5, 2006

(51) Int. Cl.
*B24B 1/00* (2006.01)

(52) U.S. Cl. .......................... 451/28; 451/57; 451/58; 451/214; 451/259

(58) Field of Classification Search ................ 451/28, 451/57, 58, 178, 214, 259, 272, 273, 278
See application file for complete search history.

(56) References Cited

U.S. PATENT DOCUMENTS

| | | | |
|---|---|---|---|
| 1,039,915 A | 10/1912 | Faber | |
| 2,600,815 A * | 6/1952 | Turner | 451/289 |
| 2,633,776 A | 4/1953 | Schenk | |
| 2,638,312 A | 5/1953 | Jedrzykowski | |
| 2,754,637 A * | 7/1956 | Schiavone | 451/306 |
| 2,962,941 A | 12/1960 | Stein et al. | |
| 3,885,925 A | 5/1975 | Tatar | |
| 4,265,053 A | 5/1981 | Kotthuas | |
| 4,309,849 A * | 1/1982 | Kowalski et al. | 451/398 |
| 4,338,748 A * | 7/1982 | Elbel | 451/541 |
| 4,589,175 A * | 5/1986 | Arrigoni | 29/889.1 |
| 4,757,645 A | 7/1988 | Ozer et al. | |
| 4,770,574 A | 9/1988 | Lotz | |
| 4,805,351 A * | 2/1989 | Dobson et al. | 451/28 |
| 4,827,675 A * | 5/1989 | Andrews | 451/28 |
| 4,914,872 A * | 4/1990 | Snyder et al. | 451/59 |
| 5,168,661 A | 12/1992 | Pedersen et al. | |
| 5,241,794 A | 9/1993 | Pedersen et al. | |
| 5,330,326 A | 7/1994 | Kuehne et al. | |
| 5,733,080 A | 3/1998 | David et al. | |
| 5,869,194 A * | 2/1999 | Dwyer | 428/542.8 |
| 6,224,468 B1 | 5/2001 | Blume et al. | |
| 6,520,838 B1 * | 2/2003 | Shaw | 451/38 |
| 6,869,259 B2 | 3/2005 | Lebkuechner | |
| 6,905,312 B2 * | 6/2005 | Bourgy et al. | 416/234 |
| 6,932,682 B2 * | 8/2005 | Kostar et al. | 451/165 |
| 7,097,540 B1 * | 8/2006 | Gosinski et al. | 451/8 |
| 7,144,307 B2 * | 12/2006 | Schwartz et al. | 451/58 |

* cited by examiner

*Primary Examiner*—Eileen P. Morgan
(74) *Attorney, Agent, or Firm*—Ogilvy Renault LLP

(57) ABSTRACT

A method for machining a rotor having a disc and a plurality of integral airfoils projecting outwardly from the disc, according to one aspect of the invention, comprises a step of machining each airfoil with a disc tool having a grinding periphery thereof adapted for removing material from the airfoils. The grinding periphery has a thickness greater than a thickness of an adjacent supporting portion of the disc to permit the grinding periphery to pass a surface of an airfoil in a multi-axis simultaneous motion, thereby matching the grinding periphery with a predetermined geometry of a portion of the airfoil.

15 Claims, 5 Drawing Sheets

METHOD OF MACHINING AIRFOILS BY DISC TOOLS

TECHNICAL FIELD

The invention relates generally to gas turbine engines and, more particularly, to an improved method of manufacturing an integral rotor blade disc using disc tools.

BACKGROUND OF THE ART

Integrally Bladed Rotors (IBR's), also commonly known as bladed discs (blisks) are important parts of gas turbine engines. An IBR comprises a hub and a plurality of integral blades projecting substantially radially outwardly therefrom. Manufacturing all IBR's is a challenging task due to the complex geometry of airfoil surfaces. Existing methods of manufacturing IBR airfoils include flank milling, point milling, and use of cutting wheels. In a flank milling process, the periphery of an end mill, typically a tapered ball-end mill, generates the desired airfoil surface geometry through one or a few passes of the cutter. In a point milling process, a similar grinder makes numerous (usually hundreds) of shallow passes until the desired airfoil surface geometry is generated. These passes may be in the direction of airflow, or in the radial direction. Another existing method of manufacturing IBR airfoils is to successively plunge into the rotor with a cup-shaped cutter, thereby generating circular slots between the airfoils. This method is limited to either roughing in complex geometry airfoils or completely machining very simple geometry airfoils. The tool used in a point milling process is usually a tapered end-mill style cutter, small enough such that the entire diameter of the tool can fit between the airfoils of the IBR. Cutting speed is limited due to the small diameter of the tool, which restricts production efficiency.

IBR's are usually made of titanium or nickel alloys and thus present a challenge for the machining of IBR airfoils, mainly due to the short cutting tool life and long cycle time when machining these materials using existing methods. Therefore, a grinding process is preferred to machine the airfoil surfaces.

Accordingly, there is a need to provide an improved method of manufacturing IBR airfoils.

SUMMARY OF THE INVENTION

It is therefore an object of this invention to provide a method for machining IBR airfoils in a roughing, semi-finishing, and/or finishing process.

In one aspect, the present invention provides a method for machining a rotor having a disc and a plurality of integral airfoils projecting outwardly from the disc. The method comprises a step of machining each airfoil with a disc tool having a grinding periphery thereof adapted for removing material from the airfoils. The grinding periphery has a thickness greater than a thickness of an adjacent supporting portion of the disc tool to permit the grinding periphery to pass a surface of the airfoil in a multi-axis simultaneous motion relative to the airfoil to match the grinding periphery with a predetermined geometry of a portion of the airfoil.

In another aspect, the present invention provides a method for machining a rotor having a disc and a plurality of integral airfoils projecting outwardly from the disc. The method comprises steps of machining a portion of a surface of each airfoil with a conical disc tool in one pass with respect to the surface; repeating the above machining step for other portions of the surface until completing machining of the entire surface; and wherein the conical disc tool has a grinding periphery at a wide end thereof adapted for removing material from the airfoil in a simultaneous motion of up to three transactional and up to two angular degrees of freedom to allow machining of varying amounts of a curvature along the airfoil, thereby achieving a predetermined geometry of a portion of the airfoil in a single pass.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
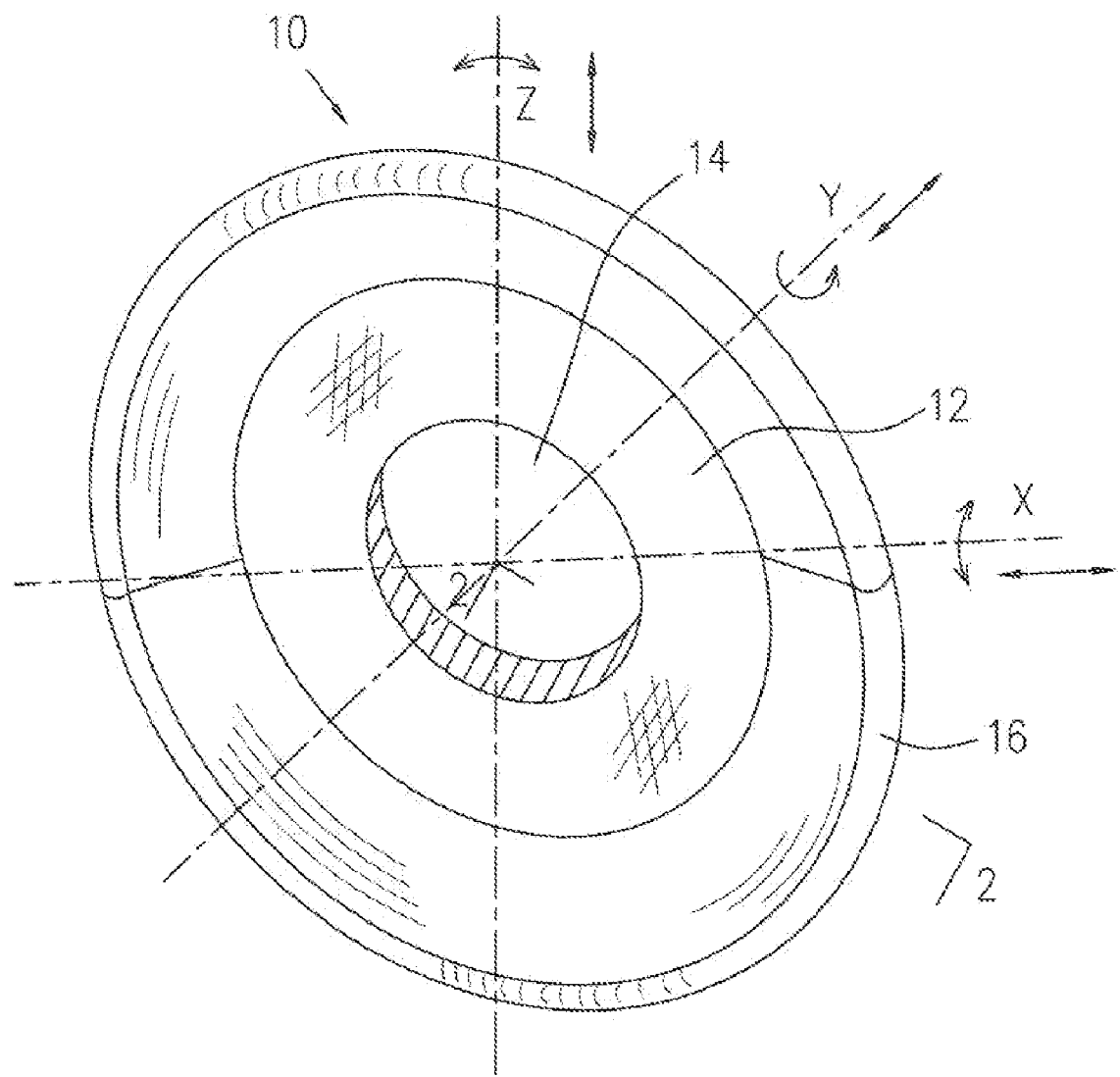
FIG. 1 is a perspective view of a disc grinding tool having three translational (X, Y and Z axes) and two angular (about the x and Z axes) degrees of freedom of motion in which the rotation about the Y axis is the grinding rotation.
Figure 2:
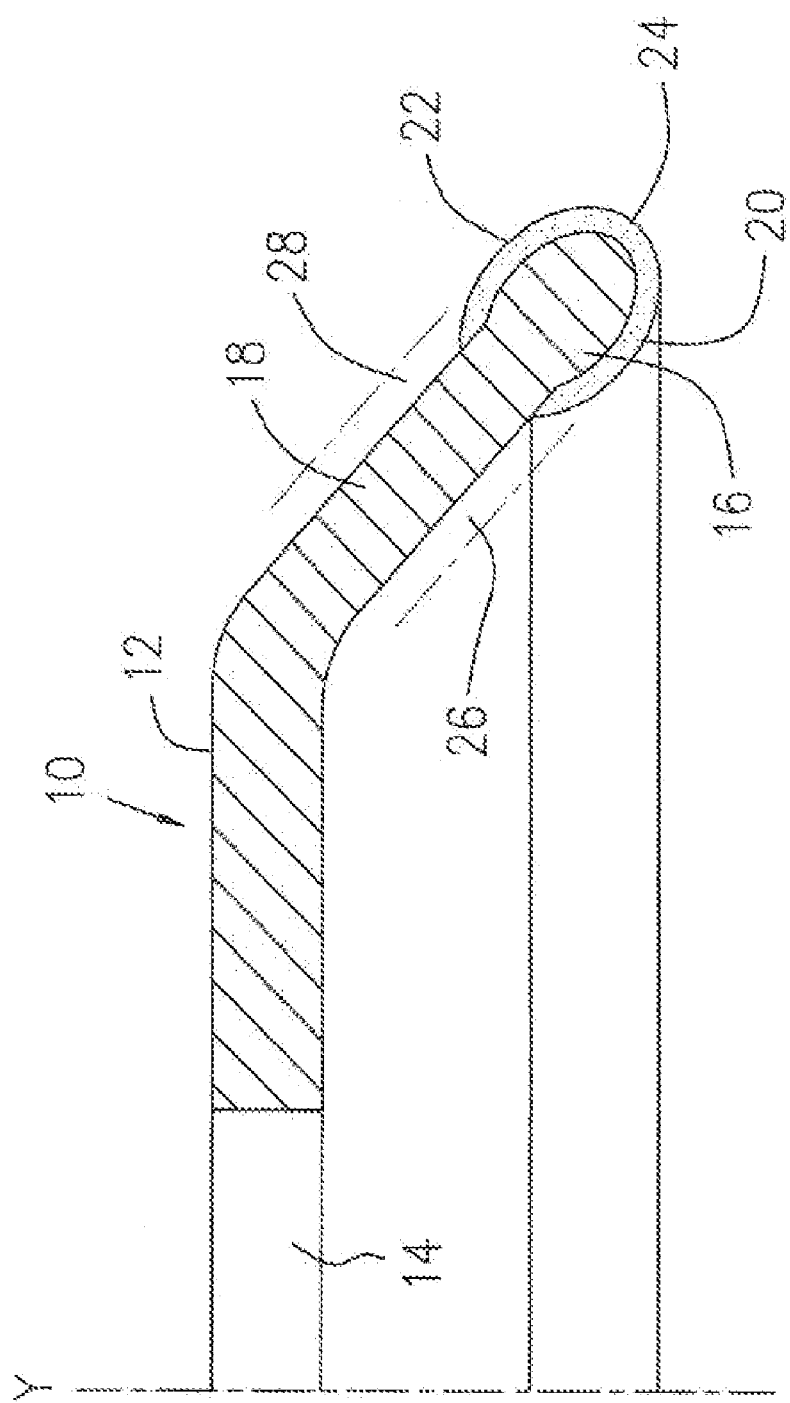
FIG. 2 is a partial cross-sectional view of the disc grinding tool of FIG. 1 taken along line 2-2, showing the structural details thereof.

It is a challenging task to machine Integrated Bladed Rotor (IBR) airfoils in a machining process, and a grinding process is preferably when the IBR is made of a nickel alloy. Grinding tools are usually made with discs having relatively large diameters. The present invention provides a method for machining complex geometries of parts, including IBR airfoils, using a disc tool having a grinding periphery thereof which is illustrated in FIGS. 1 and 2, in accordance with one embodiment of the present invention.

The disc tool, generally indicated by numeral 10 generally includes a disc plate 12 made of a metal or other suitable material for grinding tools. The disc plate 12 has a diameter greater than the width of circumferential spaces between airfoils (see FIGS. 3-5) of an IBR to be machined, and a thickness smaller than the width of the spaces in order to allow a peripheral portion of the disc plate 12 to enter the space between two adjacent airfoil blanks or semi-finished airfoils. The disc plate 12 defines a central aperture 14 adapted to be coaxially mounted to a rotating shaft or disc arbor (not shown) of a grinding machine such that the disc plate 12 is enabled to not only rotate together with the rotating shaft about the shaft longitudinal axis Y, but also to move together with the rotating shaft in a multi-axis simultaneous motion of three translational and two angular degrees of freedom. The simultaneous motion of three translational and two angular degrees of freedom of the disc plate 12, is clearly illustrated by the arrows in FIG. 1, i.e. a translational motion in either direction along axis X, a translational motion in either direction along axis Y, a translational motion in either direction along axis Z, an angular motion in either angular direction about axis X and an angular motion in either angular direction about axis Z.

The disc plate 12 is preferably bent at a circumferential thereof, towards one side such that the entire disc plate 12 forms a truncated conical shape. The disc plate 12 further includes a grinding periphery 16 located at the wide end of the truncated conical configuration. The remaining portion of the disc plate 12 thus forms a truncated conical supporting portion 18 to support the grinding periphery 16. The grinding periphery 16 is preferably defined in a convex profile including a convex inner grinding edge 20 and a convex outer grinding edge 22, which are smoothly joined together at a tip 24 of the grinding periphery 16, to form a tip radius as shown in FIG. 2. Thus, the grinding periphery 16 possesses a maximum thickness between the inner and outer grinding edges 20, 22, which is greater than the thickness of the disc plate 12, thereby creating inner and outer clearances 26, 28 with respect to the supporting portion 18 which is adjacent to the grinding periphery 16. It should be noted that the maximum thickness of the grinding periphery 16 should be smaller than the width of spaces between adjacent airfoils of an IBR to be machined.

The grinding periphery in this embodiment is coated with a layer of abrasive media such that the disc tool 10 functions as a plated or vitrified grinding wheel to be used in a grinding process. Alternative to this embodiment, the entire disc plate 12 including the grinding periphery 16 can be made of the abrasive media.

Figure 3:
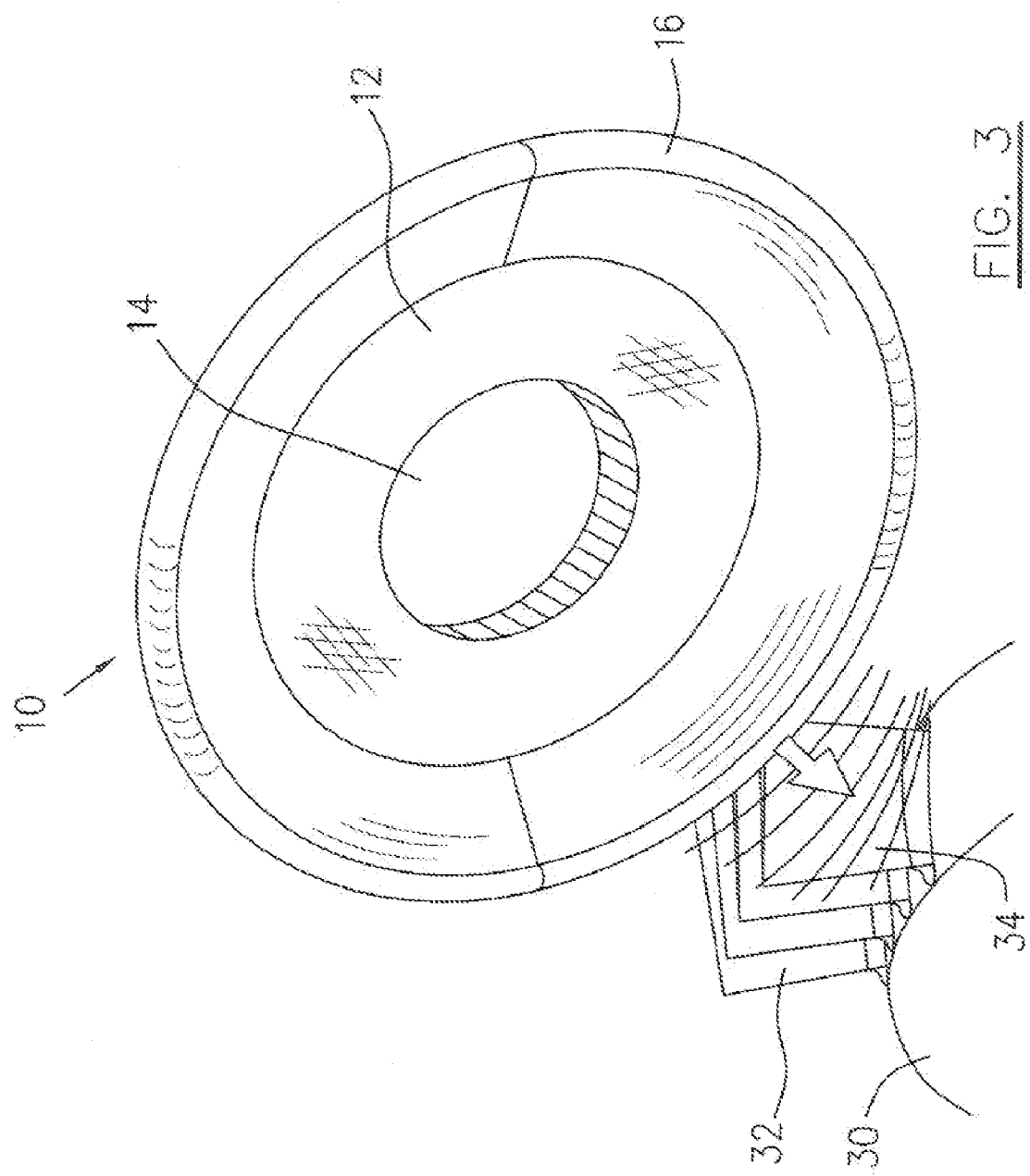
FIG. 3 is a schematic illustration of an Integral Bladed Rotor (IBR) airfoil machining process, showing a sample entry path of the disc tool of FIG. 1 on a pressure side of an airfoil.
Figure 4:
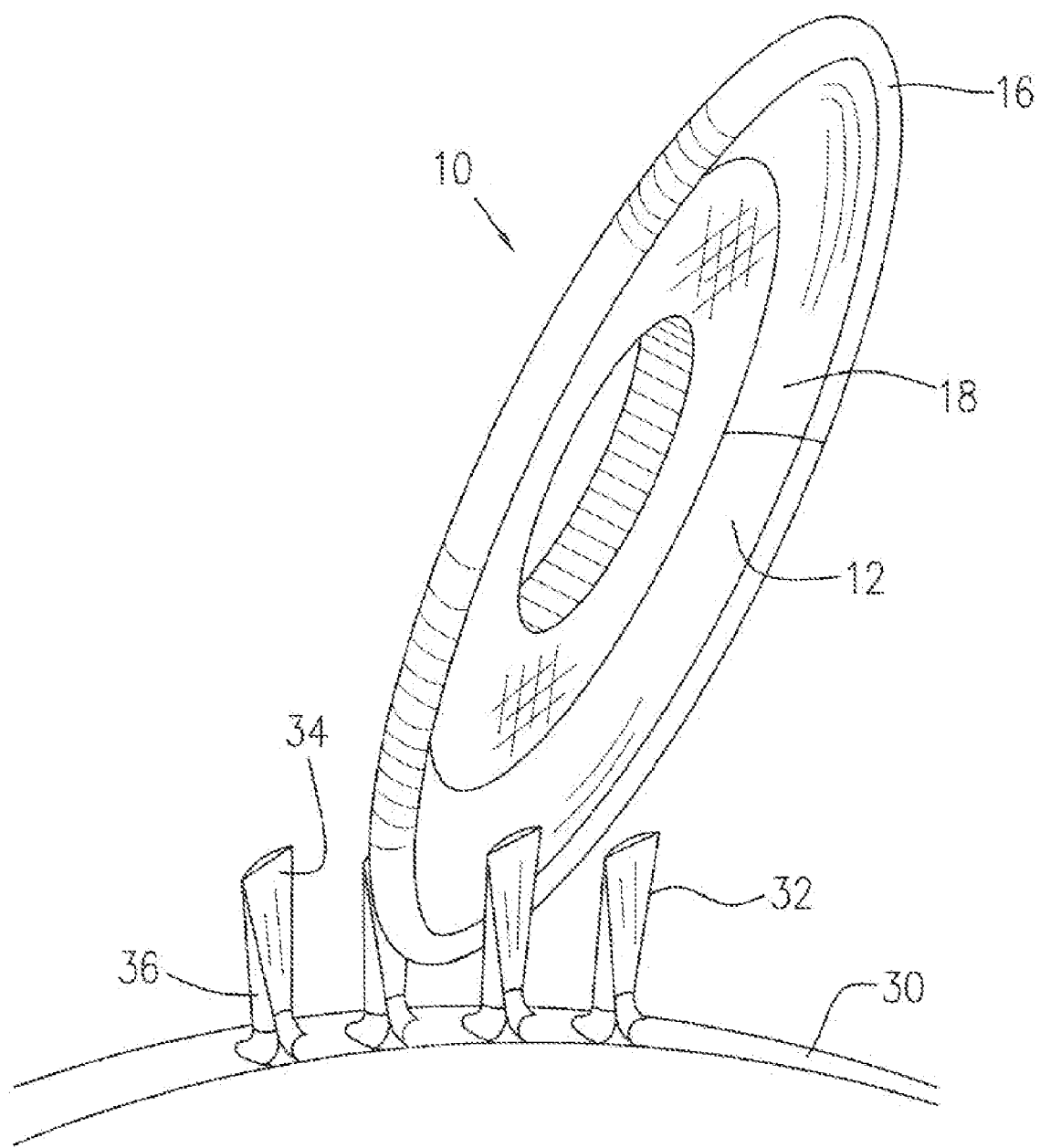
FIG. 4 is a schematic illustration of an IBR airfoil machining process, showing another example of machining on the pressure side of an airfoil.
Figure 5:
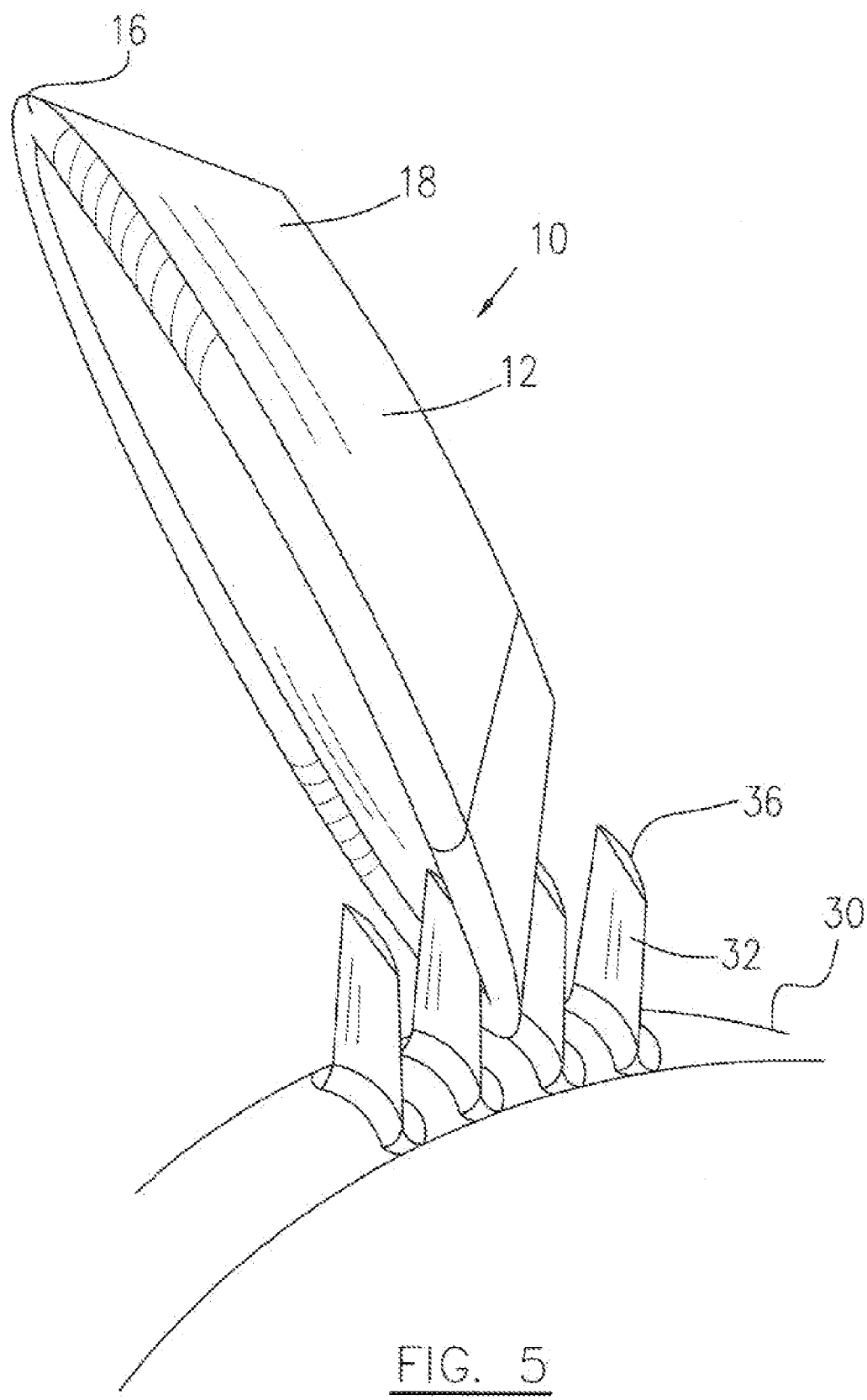
FIG. 5 is a schematic illustration of an IBR airfoil machining process, showing an example of the machining of a suction side of an airfoil.

FIGS. 3-5 illustrate machining processes of airfoils 32 of an IBR 30, using the disc tool of FIGS. 1 and 2, in accordance with the embodiments of the present invention. The grinding periphery 16 of the disc tool 10 removes material from each airfoil 32 when the disc plate 12 rotates and the grinding periphery 16 thereof passes a surface, for example, the surface of the airfoil pressure side 34 as shown in FIG. 3, in a multi-axis simultaneous motion, thereby matching the arc position of the grinding periphery 16 with a predetermined geometry of a portion of the airfoil. Such a machining step in one pass of the grinding periphery 16, is repeated for other portions of the surface of the airfoil pressure side 34 in a plurality of passes of the grinding periphery 16, until the entire surface of the airfoil pressure side 34 has been shaped to the predetermined geometry.

The grinding periphery 16 enters the IBR 30 in each single pass by plunging substantially radially from an airfoil tip (not indicated) toward the disc (not indicated) of the IBR 30, as shown in FIG. 3. The grinding periphery 16 of the disc tool 10 then exits the IBR 30 in a direction substantially opposite to the entry direction, when an entry pass is completed. The disc tool 10 is then adjusted to a position relative to the IBR 30 in order to enter the IBR 30 in a pass at another trajectory so as to machine a portion of the airfoil pressure side 34 adjacent to the portion of the surface machined during the previous entry pass.

It should be noted that in order to match the grinding periphery 16 of the disc tool 10 with any predetermined geometry of the airfoil 32, the disc tool 10 moves in a multi-axis simultaneous motion in both single passes (when entering and/or exiting pass) and in adjustment movements between passes. The multi-axis simultaneous motion of the disc tool 10 includes up to three translational and two angular degrees of freedom as illustrated in FIG. 1, which ensures matching of the grinding periphery 16 of the disc tool 10 with any arbitrary geometry of the airfoils 32, provided that the anti-axis simultaneous motion of the disc tool 10 is appropriately programmed. Particularly, while the grinding periphery 16 is in contact with the airfoil 32, two angular degrees of freedom of the disc too 10 are optimized at each position thereof in order to best match the arc of the grinding periphery 16 with the desired geometry of the airfoil 32. The inner and outer clearances 26, 28 illustrated in FIG. 2, advantageously provide space to more conveniently manipulate the multi-axis simultaneous motion of the disc tool 10 during the machining process, without causing interference between the adjacent supporting portion 18 of the disc blade 12 and the airfoil 32, thereby allowing machining of varying amounts of curvature along the airfoil 32.

The grinding periphery 16 of the disc tool 10 can also enter the IBR 30 gradually from the leading or trailing edge (not indicated) of the airfoil 32, and continue therethrough in a single pass. The disc plate 10 is then adjusted in position relative to the IBR 30 such that the grinding periphery 16 of the disc tool 10 enters the IBR 30 in another pass relatively deeper thereinto with respect to the previous pass. These steps are repeated until the entire surface of either the pressure side 34 or the suction side 36 of the airfoil 32 is machined.

The truncated conical shape of the disc plate 12 advantageously provides convenience of machining the concave airfoil pressure side 34 and convex airfoil suction side 36, as illustrated in FIGS. 4 and 5. It is convenient to machine the concave airfoil pressure side 34 using the outer grinding edge 22 of the grinding periphery 16 of the disc tool 10 shown in FIG. 2, which possesses an outer diameter forming a convex arc in a circumferential direction of the disc tool 10. In contrast to the concave airfoil pressure side 34, the airfoil suction side 36 is convex and is thus convenient to be machined using the inner grinding edge 20 of the grinding periphery 16 of the disc tool 10 as shown in FIG. 2, which presents an inner diameter of the airfoil 32, forming a concave arc in the circumferential direction of the disc tool 10. The amount of material which can be removed from the surface of the airfoil 32 while the grinding periphery 16 of the disc tool 10 is grinding with the respective inner and outer grinding edges 20, 22 will depend partially on the respective clearances 26, 28 (see FIG. 2).

Therefore, it is preferable to machine the IBR 30 such that the grinding periphery 16 of the disc tool 10 enters the IBR 30 in a first pass to machine a surface of a first airfoil 32 using one of the inner and outer grinding edges 20, 22, and exits the IBR 30 in a second pass to machine a surface of an adjacent airfoil using the other of the inner and outer grinding edges 20, 22. For example, the grinding periphery 16 of disc tool 10 enters the IBR 30 to machine the convex airfoil pressure side 34 using the outer grinding edge thereof as illustrated in FIG. 4. When this entering pass is completed, the disc tool 10 is adjusted in position without being retreated from the space between airfoils 32, to make an exit pass from another trajectory in order to machine the convex airfoil suction side 36 of the airfoil 32 adjacent to the airfoil 32 previously machined in the last entry pass of the grinding periphery 16 of the disc tool 10. Machining of the convex airfoil suction side 36 during the exit pass is conducted by the inner grinding edge 20 of the grinding periphery 16, as illustrated in FIG. 5.

This will make the machining process more efficient by eliminating or reducing the time for retreating the grinding periphery 16 from the space between the airfoils 32. Therefore, the grinding periphery 16 is effectively machining the IBR 30 during both entry and exit passes. Another example of such a machining process is to machine an airfoil on entry and take a second machining pass on the same airfoil on exit. Any time the grinding periphery 16 of the disc tool 10 works on an exit pass, the clearance 26 and 28 is used to expose the grinding edges 20 and 22. Nevertheless, it is not necessary to have this clearance and will depend on the tool path and airfoil geometry.

It is also understood that the grinding periphery 16 of the disc tool 10 can continue machining one surface of an airfoil 32 until the machining of this surface is completed if this is desirable for other considerations. In such a practice, the grinding periphery 16 of the disc tool 10 can effectively machine the airfoil only during entry passes, or during both entry and exit passes.

The method of machining IBR airfoils using the disc tool described in the embodiments of the present invention can be advantageously used in a machining process to rough, semi-finish and/or finish a semi-arbitrary airfoil surface.

The above description is meant to be exemplary only, and one skilled in the art will recognize that changes may be made to the embodiments described without departure from the scope of the invention disclosed. For example, although the disc plate of the disc tool has a truncated conical shape as described in this embodiment of the present invention, a flat disc plate or a disc plate having a curved profile such as partially or semi-spherical-like configurations and combinations of any of those shapes would fall within the scope of the present invention. It is also understood that although an IBR of an axial compressor/turbine type is illustrated in the drawings for description of the embodiment of the present invention, this invention can be equally applicable to the machining of airfoils of an impeller. Still other modifications which fall within the scope of the present invention will be apparent to those skilled in the art, in light of a review of this disclosure, and such modifications are intended to fall within the appended claims.

The invention claimed is:

1. A method for machining a rotor having a disc and a plurality of integral airfoils projecting outwardly from the disc, the method comprising a step of machining each airfoil with a disc tool having a grinding periphery thereof adapted for removing material from the airfoils, the grinding periphery having a thickness greater than a thickness of an adjacent supporting portion of the disc tool in order to permit the grinding periphery to pass a surface of an airfoil in a multi-axis simultaneous motion, thereby matching the grinding periphery with a predetermined geometry of a portion of the airfoil.

2. The method as claimed in claim 1 wherein the adjacent supporting portion is configured in a truncated conical shape to support the grinding periphery located at a wide end thereof.

3. The method as defined in claim 1 wherein the grinding periphery comprises an inner grinding edge located at an inner side of the grinding periphery and an outer grinding edge located at an outer side of the grinding periphery.

4. The method as defined in claim 3 comprising a step of machining a concave side of the airfoil with the outer grinding edge of the disc tool.

5. The method as claimed in claim 4 comprising a step of machining a convex side of the airfoil with the inner grinding edge of the disc tool.

6. The method as defined in claim 5 wherein the multi-axis simultaneous motion of the grinding periphery relative to the airfoil comprises up to three translational and up to two angular degrees of freedom.

7. The method as defined in claim 3 wherein the grinding periphery of the disc tool comprises an abrasive medium.

8. The method as defined in claim 3 wherein the grinding periphery of the disc tool comprises a plurality of discrete grinding elements.

9. The method as defined in claim 3 wherein the inner grinding edge is configured in a convex profile, to thereby form an inner clearance with respect to an inner surface of the adjacent support portion.

10. The method as defined in claim 3 wherein the outer grinding edge is configured in a convex profile, to thereby form an outer clearance with respect to an outer surface of the adjacent support portion.

11. A method for machining a rotor having a disc and a plurality of integral airfoils projecting outwardly from the disc, the method comprising steps of:
    machining a portion of a surface of each airfoil with a conical disc tool in one pass, with respect to the surface;
    repeating the above machining step for other portions of the surface until completing machining of the entire surface; and
    wherein the conical disc tool has a grinding periphery at a wide end thereof adapted for removing material from the airfoil in a simultaneous motion of up to three translational and up to two angular degrees of freedom to allow machining of varying amounts of a curvature along the airfoil, thereby achieving a predetermined geometry of a portion of the airfoil in a single pass.

12. The method as claimed in claim 11 wherein the grinding periphery comprises a convex profile having a maximum thickness thereof greater than a thickness of an adjacent supporting portion of the disc tool, thereby creating inner and outer clearances with respect to respective sides of the adjacent supporting portion.

13. The method as defined in claim 11 wherein in a pass, the grinding periphery of the conical disc tool enters the rotor in a substantially radial direction from an airfoil tip toward the disc of the rotor.

14. The method as defined in claim 11 wherein in a pass, the grinding periphery of the conical disc tool enters the rotor from one of leading and trailing edges of the airfoil.

15. The method as defined in claim 11 wherein in a first pass, the grinding periphery enters the rotor, machining a surface of a first airfoil using one of the inner and outer grinding edges, and wherein in a second pass, the grinding periphery exits the rotor, matching a surface of an adjacent second airfoil using the other of the inner and outer grinding edges.

* * * * *